US009299383B2

United States Patent
Nishidate

(10) Patent No.: US 9,299,383 B2
(45) Date of Patent: Mar. 29, 2016

(54) OPTICAL ELEMENT HOLDER AND OPTICAL PICKUP PROVIDED WITH SAME

(75) Inventor: Tetsuo Nishidate, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 357 days.

(21) Appl. No.: 13/348,797

(22) Filed: Jan. 12, 2012

(65) Prior Publication Data

US 2012/0193504 A1   Aug. 2, 2012

(30) Foreign Application Priority Data

Jan. 28, 2011   (JP) ................................. 2011-016714

(51) Int. Cl.
| | |
|---|---|
| G11B 7/12 | (2012.01) |
| G11B 7/135 | (2012.01) |
| G11B 7/085 | (2006.01) |
| G11B 7/08 | (2006.01) |
| G11B 7/22 | (2006.01) |
| H04N 5/225 | (2006.01) |
| G11B 7/1353 | (2012.01) |

(52) U.S. Cl.
CPC .. G11B 7/12 (2013.01); G11B 7/08 (2013.01); G11B 7/08582 (2013.01); G11B 7/135 (2013.01); G11B 7/22 (2013.01); H04N 5/2251 (2013.01); *G11B 7/1353* (2013.01)

(58) Field of Classification Search
CPC ........ G11B 7/12; G11B 7/135; G11B 7/1205; G11B 7/08582; G11B 7/08; G11B 7/22
USPC .................. 369/112.03; 248/222.11, 229.16, 248/229.26, 231.81
See application file for complete search history.

(56) References Cited

U.S. PATENT DOCUMENTS

| 5,820,168 | A | * | 10/1998 | De Giacomoni | .......... F16L 3/00 248/56 |
|---|---|---|---|---|---|
| 6,507,543 | B2 | * | 1/2003 | Fujimaki et al. | ........... 369/44.19 |
| 7,137,132 | B2 | * | 11/2006 | Sogawa et al. | ................ 720/652 |
| 7,315,504 | B2 | * | 1/2008 | Nakamura | ..................... 369/116 |
| 8,468,553 | B2 | * | 6/2013 | Nishidate | ...................... 720/675 |
| 8,488,422 | B2 | * | 7/2013 | Yoshinaga et al. | ......... 369/44.15 |
| 8,651,443 | B2 | * | 2/2014 | Mayer | ........................ 248/228.7 |
| 2001/0014059 | A1 | * | 8/2001 | Fujimaki et al. | ........... 369/44.14 |
| 2002/0118628 | A1 | * | 8/2002 | Tachikawa et al. | ....... 369/112.29 |

(Continued)

FOREIGN PATENT DOCUMENTS

| EP | 0649130 | * | 4/1995 | |
|---|---|---|---|---|
| EP | 1513141 A2 | * | 3/2005 | ............. G11B 7/085 |

(Continued)

OTHER PUBLICATIONS

Japanese Office Action dated Jan. 15, 2013 for patent application No. JP2011-016714.

*Primary Examiner* — Terrell McKinnon
*Assistant Examiner* — Eret McNichols
(74) *Attorney, Agent, or Firm* — Morgan, Lewis & Bockius LLP

(57) ABSTRACT

An optical element holder comprises a placement face on which an optical element is placed, the placement face obtained using one face of a sheet of metal; a positioning wall used for positioning the optical element placed on the placement face, the positioning wall being a stepped portion obtained by folding of the sheet of metal; and a spring section, which is a portion obtained by further folding of part of the portion folded over in order to obtain the positioning wall.

19 Claims, 9 Drawing Sheets

(56) References Cited

U.S. PATENT DOCUMENTS

| | | | |
|---|---|---|---|
| 2002/0186645 A1* | 12/2002 | Jang et al. | 369/221 |
| 2003/0067694 A1* | 4/2003 | Sogawa | 359/871 |
| 2003/0179677 A1* | 9/2003 | Nakamura | 369/53.26 |
| 2004/0076107 A1* | 4/2004 | Sogawa et al. | 369/244 |
| 2004/0090881 A1* | 5/2004 | Nakata et al. | 369/44.11 |
| 2004/0257927 A1* | 12/2004 | Sogawa et al. | 369/44.14 |
| 2005/0007906 A1* | 1/2005 | Horinouchi et al. | 369/44.37 |
| 2006/0028935 A1* | 2/2006 | Mori et al. | 369/44.37 |
| 2006/0143639 A1* | 6/2006 | Ke et al. | 720/683 |
| 2007/0211582 A1* | 9/2007 | Suetsugu | 369/44.11 |
| 2008/0080340 A1* | 4/2008 | Nishiyama et al. | 369/44.37 |
| 2009/0004408 A1 | 1/2009 | Nakanishi et al. | |
| 2009/0135704 A1* | 5/2009 | Watanabe et al. | 369/109.01 |
| 2009/0323504 A1* | 12/2009 | Aoki et al. | 369/112.23 |
| 2011/0067041 A1* | 3/2011 | Akutsu et al. | 720/703 |
| 2012/0113490 A1* | 5/2012 | Nakagawa | 359/198.1 |
| 2012/0198484 A1* | 8/2012 | Nishidate | 720/672 |
| 2012/0198485 A1* | 8/2012 | Nishidate | 720/689 |
| 2012/0204199 A1* | 8/2012 | Okazaki | 720/681 |
| 2012/0204200 A1* | 8/2012 | Okazaki | 720/695 |
| 2013/0107252 A1* | 5/2013 | Akutsu et al. | 356/300 |
| 2013/0121126 A1* | 5/2013 | Yamagishi | 369/112.01 |
| 2013/0223202 A1* | 8/2013 | Kinoshita et al. | 369/120 |

FOREIGN PATENT DOCUMENTS

| | | | | |
|---|---|---|---|---|
| EP | 1696427 A1 * | 8/2006 | | G11B 7/22 |
| EP | 2068316 A1 * | 6/2009 | | G11B 7/08582 |
| EP | 2450892 A1 * | 5/2012 | | |
| JP | 02218028 A * | 8/1990 | | G11B 7/135 |
| JP | 11-110775 | 4/1999 | | |
| JP | 3263569 B2 | 3/2002 | | |
| JP | 2006-260678 | 9/2006 | | |
| JP | 2009-31756 | 2/2009 | | |
| JP | 2009087495 A * | 4/2009 | | |
| JP | 2009238340 A * | 10/2009 | | |
| JP | 2010244631 A * | 10/2010 | | |
| JP | 2011-003230 | 1/2011 | | |
| JP | 2011108322 A * | 6/2011 | | |
| KR | 2006062745 A * | 6/2006 | | |
| WO | WO 2007063956 A1 * | 6/2007 | | G11B 7/12 |
| WO | WO 2007108440 A1 * | 9/2007 | | G11B 7/125 |
| WO | WO 2012002196 A1 * | 1/2012 | | |
| WO | WO 2013077272 A1 * | 5/2013 | | |

* cited by examiner

LINE CONNECTING
BETWEEN PROTRUDING SECTION
AND RECESSED SECTION

OPTICAL ELEMENT HOLDER AND OPTICAL PICKUP PROVIDED WITH SAME

The present application is based on Japanese Patent Application No. 2011-016714 filed on Jan. 28, 2011, the contents of which are hereby incorporated by reference.

BACKGROUND OF THE INVENTION

1. Field of the Invention

The present invention relates to an optical element holder for holding, e.g., a diffraction grating or other optical element. The invention also relates to an optical pickup provided with such an optical element holder.

2. Description of Related Art

In the conventional art, diffraction gratings for splitting light emitted from a light source are occasionally arranged in optical pickup optical systems (see, for example, Japanese Patent No. 3263569 and JP-A-2006-260678). Due to the presence of the diffraction grating, it becomes possible to employ, for example, a three-beam method, differential push-pull (DPP) method, or other method to generate a tracking error signal.

In a typical configuration, the diffraction grating is fixed to a base (optical stage) of the optical pickup once a rotational adjustment has been performed to bring the positions of a plurality of spots of light formed on an optical disk to target positions.

Blu-Ray (BD) disks and other optical disks on which large volumes of information can be recorded have recently become commercially viable, and currently, most diffraction gratings provided to BD-compatible optical pickups are made of glass instead of plastics. Where a diffraction grating is formed of glass, limitations imposed by the shape thereof make it difficult to rotate the diffraction grating. For this reason, it is typical for rotational adjustment of the diffraction grating to be performed by holding the diffraction grating in a holder (optical element holder), and causing the holder to rotate, as shown in Japanese Patent No. 3263569 and JP-A-2006-260678.

There shall now be given a description of a configuration example of the conventional art where a diffraction grating is held in a holder and attached to a base of an optical pickup. FIG. 10 is a schematic perspective view showing a diffraction grating prior to attachment to a base in a conventional art optical pickup. FIG. 11 is a schematic perspective view showing a diffraction grating attached to a base in a conventional art optical pickup.

As shown in FIG. 10, in the conventional art optical pickup, a substantially cylindrical holder 102 made of resin is employed as the holder for holding a diffraction grating 101. The diffraction grating 101 is anchored in a substantially central section of the holder 102 using an adhesive or the like. The holder 102 holding the diffraction grating 101 is housed within a hollow, substantially cylindrical housing space 103a provided to a base 103 of the optical pickup.

As shown in FIG. 11, the holder 102 housed within the housing space 103a is pressed against an abutment face 103b of the base 103 by a spring 104 arranged on the reverse side of the holder 102 (see FIG. 10). Specifically, the holder 102 is held accommodated within the housing space 103a through the action of the spring 104. However, as mentioned previously, the diffraction grating 101 must be rotationally adjusted. For this reason, the urging force of the spring 104 is adjusted so that that rotational adjustment may be performed with the holder 102 pressing against the abutment face 103b.

As shown in FIG. 10, an adjustment slot 102a into which an adjustment tool is inserted is formed in the holder 102. As shown in FIGS. 10 and 11, a cutout 103c into which an adjustment tool is inserted is formed in the optical pickup base 103. For this reason, rotational adjustment of the holder 102 housed within the housing space 103a and pressed against the abutment face 103b by the spring 104 may be performed using an adjustment tool. Once rotational adjustment has been performed using the adjustment tool, the holder 102 is fixed in an immobilized manner to the base 103 using an adhesive or the like. Fixing the holder 102 using an adhesive or the like thus completes the task of attaching the diffraction grating 101 to the base 103.

SUMMARY OF THE INVENTION

In the conventional art configuration, however, a spring is needed in addition to the holder when the diffraction grating is attached to the base of the optical pickup. This results in a greater number of parts and diminished work efficiency, and makes it harder to contain costs. For this reason, the diffraction grating is desirably attached to the base of an optical pickup solely using the holder (which holds the diffraction grating), without the use of a spring.

In regard whereto, there are disclosed in Japanese Patent No. 3263569 and JP-A-2006-260678 configurations in which a diffraction grating is attached to a base of an optical pickup solely using a holder, without the use of a spring as mentioned previously. However, in the configuration of Japanese Patent No. 3263569, the holder holding the diffraction grating must be press-fit into a frame (base) when the diffraction grating is attached to the optical pickup, leaving room for improvement in respect of work efficiency. In the configuration of JP-A-2006-260678, the holder, and a device frame (base) to which the holder is attached, are of complex construction, and dimensioning thereof may be very difficult.

In view of this point, it is an objective of the present invention to provide an optical element holder suitable for an optical element requiring rotational adjustment. More specifically, it is an objective of the present invention to provide an optical element holder of simple configuration. A further objective is to provide an optical element holder facilitating the task of attachment to an object for attachment. Yet another objective of the present invention is to provide an optical pickup at reduced cost through the use of an optical element holder of such description.

The optical element holder of the present invention for attaining the aforedescribed objectives comprises a placement face on which an optical element is placed, the placement face obtained using one face of a sheet of metal; a positioning wall used for positioning the optical element placed on the placement face, the positioning wall being a stepped portion obtained by folding of the sheet of metal; and a spring section, which is a portion obtained by further folding of part of the portion folded over in order to obtain the positioning wall.

The optical element holder of the present aspect is obtained by sheet-metal working, wherein the spring portion can be integrally provided to the holder. For this reason, there is no need to prepare a separate spring as in the conventional art configuration. Moreover, because the spring section can be utilized for attachment to an object for attachment (the base of an optical pickup or the like), the task for attaching the optical element holder to the object for attachment is simplified. According to the present aspect, the positioning wall is obtained by folding sheet-metal, whereby the optical element holder is readily given a simple shape.

In the optical element holder of the aforedescribed configuration, the sheet of metal is preferably provided with a first portion having the placement face, a second portion folded over from a first end section of the first portion and overlaid in a state of contacting the first portion to form the positioning wall, and a third portion folded over from a first end section of the second portion to form the spring section. In so doing, it is possible to obtain an optical element holder of a simple configuration, suited to an optical element requiring rotational adjustment.

The optical element holder of the aforedescribed configuration preferably further comprises a substantially V-shaped protruding section having a distal end used as a rotation center when rotational adjustment of the optical element is performed. The optical element holder of the aforedescribed configuration preferably further comprises a jig-engaging portion for engaging a jig for the aforedescribed rotational adjustment, the jig-engaging portion provided at a position opposing the protruding section. It is thereby possible for rotational adjustment of the optical element to be performed with high accuracy.

The optical element holder of the aforedescribed configuration may further comprise a stopper section for restricting the amount of rotation when rotational adjustment of the optical element is performed. According to the present aspect, the optical element is not rotated any further than necessary, and the adjustment procedure can be performed quickly.

The optical pickup of the present invention for attaining the aforedescribed objectives is provided with an optical element having the aforedescribed configuration, and an attachment section to which the optical element holder is attached. According to the present aspect, an optical element requiring rotational adjustment is attached to the attachment section (provided to the base) of the optical pickup using a small number of parts, so that the cost of the optical pickup decreases.

In the optical pickup of the aforedescribed configuration, the optical element holder is preferably provided with a substantially V-shaped protruding section having a distal end used as a rotation center when rotational adjustment of the optical element is performed; and a substantially V-shaped slotted section for engaging the protruding section is formed on the bottom face of the attachment section. According to the present aspect, rotational adjustment of the optical element is easily performed, and once the optical element has been attached, the likelihood of the optical element shifting in location due to temperature changes, shocks, or the like can be minimized.

In the optical pickup of the aforedescribed configuration, the optical element may be a diffraction grating. In most cases, diffraction gratings provided in optical pickups require rotational adjustment, and the present configuration is a suitable configuration example of the present invention.

Thus, according to the present invention there can be provided an optical element holder suitable for an optical element requiring rotational adjustment. According to the present invention, there can also be provided an optical pickup whose cost can be lowered through the use of such an optical element holder.

DETAILED DESCRIPTION OF PREFERRED EMBODIMENTS

The embodiments of the optical element holder and the optical pickup of the present invention will be described below with reference to the drawings. Hereinbelow is described an example in which the optical element holder of the present invention is a holder for holding a diffraction grating (diffraction grating holder), and the diffraction grating holder is implemented in an optical pickup.

Figure 1A:
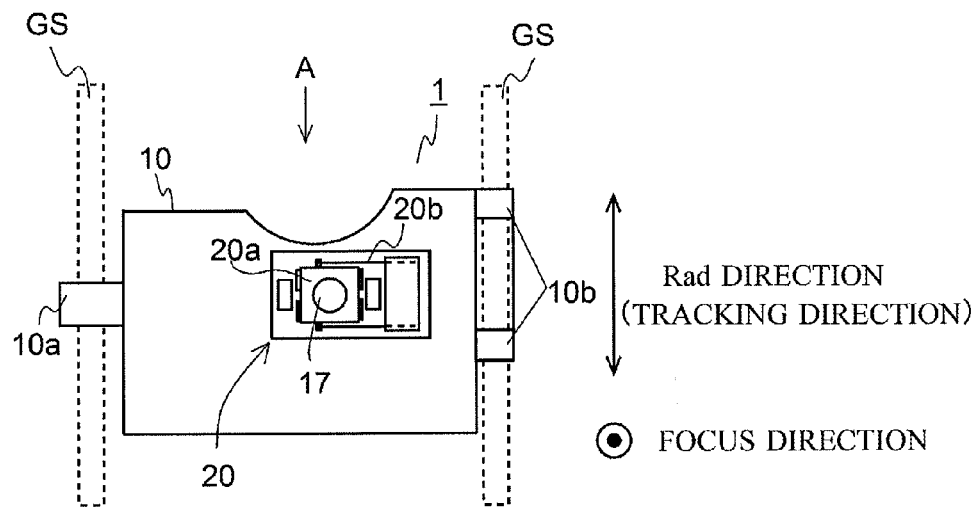
FIG. 1A is a schematic top view showing the configuration of an optical pickup of the present embodiment.
Figure 1B:
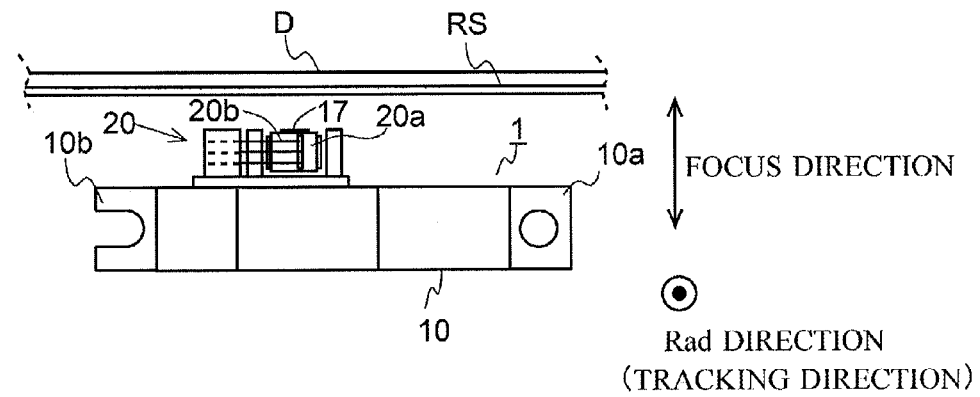
FIG. 1B is a schematic side view showing the configuration of the optical pickup of the present embodiment.

FIG. 1A and FIG. 1B are schematic plan views showing a configuration of an optical pickup of the present embodiment, wherein FIG. 1A is a top view of the optical pickup and FIG. 1B is a side view of the optical pickup. FIG. 1B is a view taken along arrow A shown in FIG. 1A. To facilitate understanding, an optical disk D is also shown in FIG. 1B.

As shown in FIG. 1A and FIG. 1B, the optical pickup 1 of the present embodiment is configured to be provided with a pickup base 10 on which a plurality of optical members including a diffraction grating are placed, and an objective lens actuator 20 fixedly arranged on the pickup base 10.

Bearing sections 10a, 10b are provided in the left and right end sections of the pickup base 10. These bearing sections 10a, 10b slidably support the pickup base 10 on guide shafts GS (shown by broken lines in FIG. 1A) provided to an optical disk device (a device for playing or recording onto the optical disk D). The guide shafts GS provided to the optical disk device are arranged so as to extend in a radial direction (Rad direction) of the optical disk. The optical pickup 1, which can slide along the guide shafts GS, can access desired addresses on the rotating optical disk D, and read and write information.

The objective lens actuator 20 is a device enabling an objective lens 17 provided to the optical system of the optical pickup 1 to move in a focus direction (a direction perpendicular to an information recording surface RS of the optical disk D) and in a tracking direction (the same direction as the Rad direction). During reading and writing of information in the optical pickup 1, it is necessary to perform focusing control so that the focal point of the objective lens 17 is always located on the information recording surface RS of the optical disk D. Also, during reading and writing of information in the optical pickup 1, it is necessary for tracking control to be performed so that the locations of light spots focused onto the information recording surface RS of the optical disk D by the objective lens 17 always follow the track of the optical disk D. The objective lens actuator 20 is driven when the focusing control and tracking control are performed.

The objective lens actuator 20 has a lens holder 20a for holding the objective lens 17, and is configured so that the lens holder 20a is slidably supported by a wire 20b. The objective lens actuator 20 moves the objective lens 17 together with the lens holder 20a using a force generated utilizing a coil and magnet. Such an objective lens actuator is of a type that is publicly known, for which reason it will not be described in detail herein.

Figure 2:
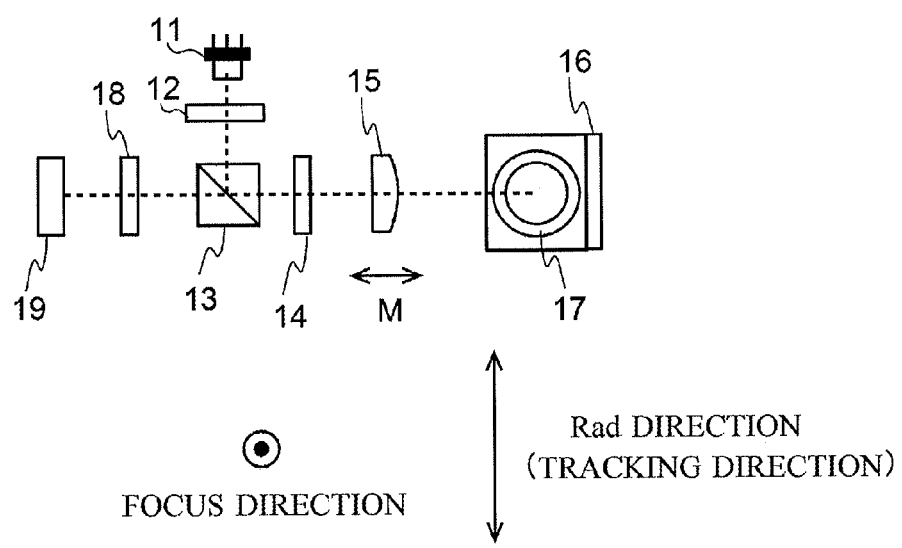
FIG. 2 is a schematic plan view showing the optical configuration of the optical pickup of the present embodiment.

FIG. 2 is a schematic plan view showing the optical configuration of the optical pickup of the present embodiment. The type of semiconductor laser 11 is determined by the type of optical disk D with which the optical pickup 1 is compatible (can read and write information). For example, if the optical pickup 1 is BD-compatible, the semiconductor laser 11 used will be one that emits a laser beam of a 405 nm wavelength band.

The laser beam exiting the semiconductor laser 11 travels to a diffraction grating 12 (an example of the optical element of the present invention). The diffraction grating 12 divides the impinging laser beam into a principal ray and two secondary rays. Accordingly, the laser beam exiting the semiconductor laser 11 is divided into three rays before reaching the optical disk D. In the present embodiment, the diffraction grating 12 is arranged in the optical system of the optical pickup 1 so that a tracking error signal is obtained by the DPP method. The method for obtaining a tracking error signal by the DPP method is publicly known, and will not be described herein.

The laser beam exiting the diffraction grating 12 travels to a polarizing beam splitter 13. The polarizing beam splitter 13 reflects S-polarized light (a non-limiting example being linearly polarized light) exiting the semiconductor laser 11. The laser beam reflected by the polarizing beam splitter 13 is converted to circularly polarized light by a quarter-wave plate 14. The laser beam exiting the quarter-wave plate 14 passes through a collimator lens 15, and is thereafter reflected by a raising mirror 16. The laser beam reflected from the raising mirror 16 reaches the objective lens 17 above the raising mirror 16. The objective lens 17 has the function of focusing the impinging laser beam on the information recording surface RS of the optical disk D.

Once the light has been focused on the information recording surface RS by the objective lens 17, the reflected light (returning light) reflected by the information recording surface RS passes through the objective lens 17, and is thereafter reflected by the raising mirror 16. The returning light then passes through the collimator lens 15, and is converted to P-polarized light by the quarter-wave plate 14, and transmitted through the polarizing beam splitter 13. The returning light having passed through the polarizing beam splitter 13 passes through a sensor lens 18 including a cylindrical surface, and is focused onto a photodetector 19.

Having the sensor lens 18 provided with a cylindrical surface to give astigmatism makes it possible to generate a focus error signal using the astigmatic method. The photodetector 19 functions as photoelectric conversion means for converting a received light signal to an electrical signal. The electrical signal output by the photodetector 19 travels to a signal processing section, not shown; and in the signal processing section is converted to a playback signal, a focus error signal, a tracking error signal, or the like. The focus error signal is used to perform focusing control as discussed previously, and the tracking error signal is used to perform tracking control as discussed previously.

The semiconductor laser 11, the diffraction grating 12, the polarizing beam splitter 13, the quarter-wave plate 14, the collimator lens 15, the raising mirror 16, the sensor lens 18, and the photodetector 19 are placed on the pickup base 10. The objective lens 17 is placed on the lens holder 20a of the objective lens actuator 20, and arranged on the pickup base 10.

The collimator lens 15 is capable of moving in an optical axis direction M (the left-right direction in FIG. 2), the position thereof being moved appropriately in response to a layer jump or the like. The effects of spherical aberration in the optical pickup 1 are suitably minimized thereby.

The diffraction grating 12 is placed on the pickup base 10 in a state in which the pickup base 10 is held by a holder (diffraction grating holder). In a configuration in which the diffraction grating holder is used, the optical pickup 1 of the present embodiment has a characteristic. This characteristic point (characterizing configuration) is described below.

Figure 3:
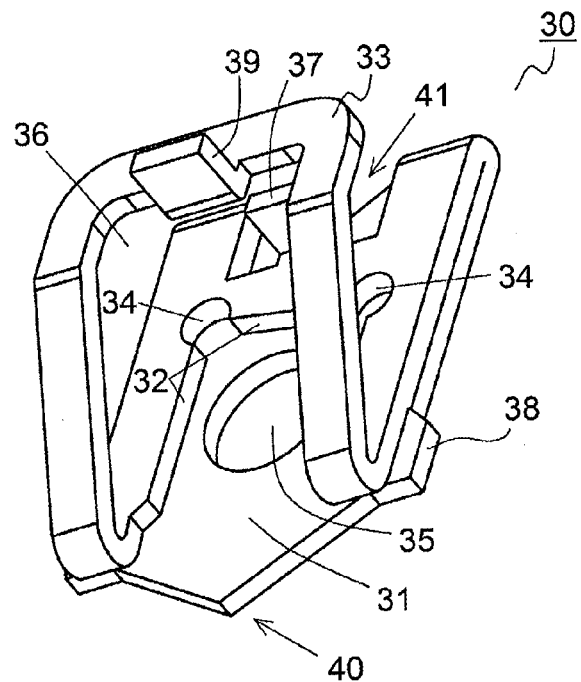
FIG. 3 is a schematic perspective view showing a configuration of a diffraction grating holder of the present embodiment.
Figure 4:
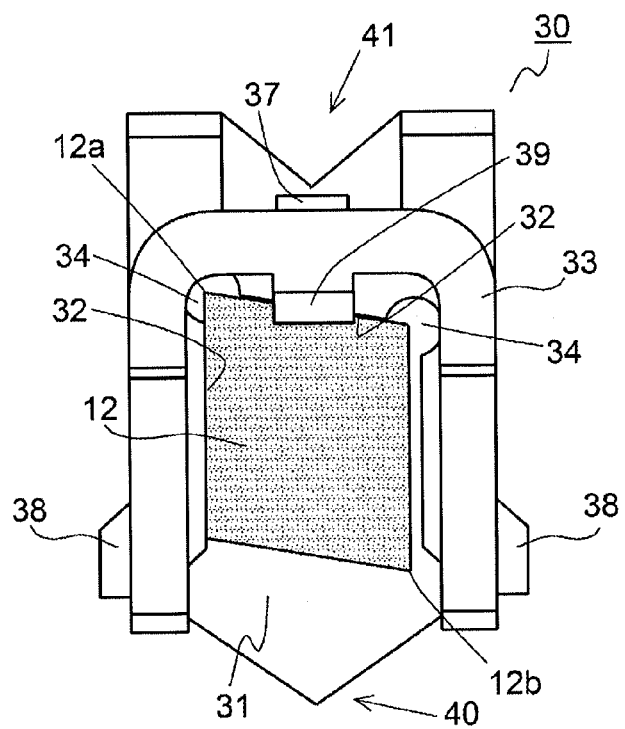
FIG. 4 is a front view showing the configuration of the diffraction grating holder of the present embodiment, the diffraction grating being shown in an attached state.
Figure 5:
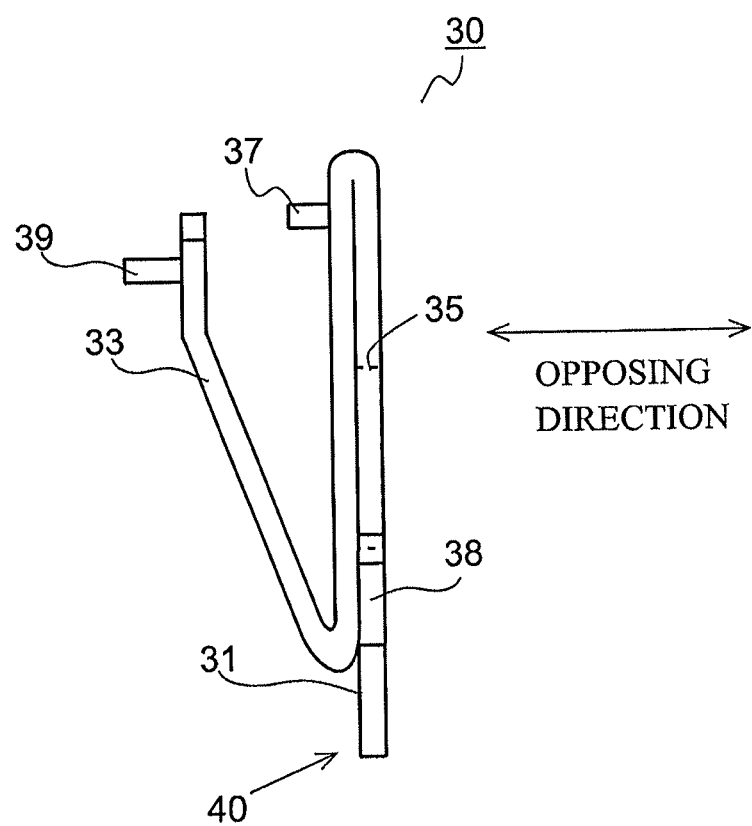
FIG. 5 is a schematic side view showing the configuration of the diffraction grating holder of the present embodiment.

FIG. 3 is a schematic perspective view showing a configuration of the diffraction grating holder of the present embodiment. FIG. 4 is a front view showing the configuration of the diffraction grating holder of the present embodiment, and showing the diffraction grating attached. FIG. 5 is a schematic side view showing the configuration of the diffraction grating holder of the present embodiment.

The diffraction grating holder 30 provided to the optical pickup 1 is obtained by working sheet metal. As shown in FIG. 3, the diffraction grating holder 30 is provided with a placement face 31 for placement of the diffraction grating 12; a positioning wall 32 obtained by folding the sheet metal, and used for positioning the diffraction grating 12 placed on the placement face 31; and a spring section 33 obtained by a fold different from the fold for obtaining the positioning wall 32.

As shown in FIG. 4, the diffraction grating 12 placed on the placement face 31 is a quadrangular prism of substantially parallel quadrilateral shape as seen in plan view. The diffraction grating 12 is made of, e.g., glass, a diffraction pattern formed on one of two faces constituting the substantially parallel quadrilateral shape. The diffraction grating 12 is held positioned in the diffraction grating holder 30, and of the four side faces thereof, two neighboring side faces are arranged abutting the positioning wall 32.

As shown in FIGS. 3 and 4, the diffraction grating holder 30 is formed with two clearance sections 34, which are substantially semicircular spaces as seen in plan view, for protecting the corners of the diffraction grating 12 placed on the placement face 31, and the like. The diffraction grating 12 placed on the placement face 31 is fixed using, e.g., an adhesive or the like. There are no particular limitations as to the adhesion sites used when the diffraction grating 12 is adhesively fixed; for example, adhesion sites in proximity to two opposing corner sections 12a, 12b of the diffraction grating 12 may be used.

The diffraction grating holder 30 is additionally provided with through-holes 35, 36, making it possible for light to impinge on the diffraction grating 12 positioned on the placement face 31, and for light to exit the diffraction grating 12 (see FIG. 3).

As shown in FIG. 5 (and shown also in FIGS. 3 and 4), a plastic-deformation-preventing rib 37 is formed on the diffraction grating holder 30 so that the spring section 33 does not bend more than necessary and cause plastic deformation. Absent this plastic-deformation-preventing rib 37, strong forces to which the spring section 33 is subjected may give rise to plastic deformation of the spring section 33, for example, during attachment of the diffraction grating holder 30 to the pickup base 10, during detachment of the diffraction grating holder 30 previously attached to the pickup base 10 (reworking), or in other circumstances.

In this regard, where, as in the diffraction grating holder 30 of the present embodiment, the plastic-deformation-preventing rib 37 is provided protruding out towards the spring section 33, the spring section 33 can be prevented from bending in excess of a given range, and plastic deformation of the spring section 33 can accordingly be prevented. The location of providing the plastic deformation-preventing rib 37, as well as the number of plastic deformation-preventing ribs 37, are not limited to those in the configuration in the present embodiment, and may be modified appropriately.

The diffraction grating holder 30 is also provided with a substantially V-shaped protruding section 40, which has a distal end used as a rotation center when rotational adjustment of the diffraction grating 12 is performed, and with a substantially V-shaped jig-engaging portion (cutout) 41 provided in an end section opposing the protruding section 40, an adjustment jig (jig for rotational adjustment) engaging in the jig-engaging portion (cutout) 41 (see FIGS. 3 and 4). The diffraction grating holder 30 is also provided with a stopper section 38 for restricting the amount of rotation (of the diffraction grating holder 30) when performing rotational adjustment of the diffraction grating 12; and with a grip section 39 formed on the spring section 33 to make the diffraction grating holder 30 easy to grip with a tweezers or another tool (see FIGS. 3 to 5).

Figure 6:
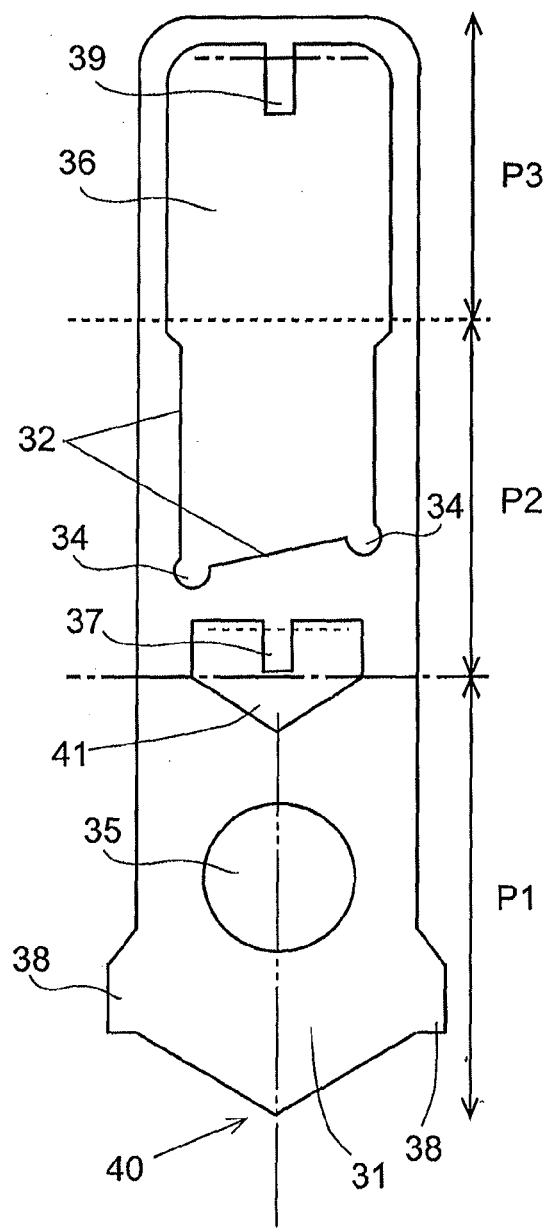
FIG. 6 is a development view showing the configuration of the diffraction grating holder of the present embodiment.

FIG. 6 is a development view showing the configuration of the diffraction grating holder of the present embodiment. In FIG. 6, the broken line shows a site for performing a mountain fold, and the single-dot and dash line shows a site for performing a valley fold. As shown in FIG. 6, the sheet metal constituting the diffraction grating holder 30 has a first portion P1, a second portion P2, and a third portion P3.

The first portion P1 is formed having a substantially pentagonal shape as seen in plan view; the diffraction grating 12 being placed on this first portion P1. Specifically, this first portion P1 has the placement face 31 on which the diffraction grating 12 is placed. The through-hole 35 of substantially circular shape as seen in plan view, the stopper section 38, the substantially V-shaped protruding section 40, and the jig-engaging portion 41 discussed previously are formed in this first portion P1. The through-hole 35 and the jig-engaging portion 41 are obtained by cutting out portions of the sheet metal.

The second section P2 (having a profile of substantially rectangular shape) continuing from the first portion P1 is valley-folded (folded over towards the near side with respect to the plane of the drawing, relative to the first portion P1), and overlaid in a state of contacting the first portion P1. Predominantly, most of the section constituting the second portion P2 is cut away except at the outer edge side. In so doing, the positioning wall (step) 32 of a thickness equivalent to the sheet (see FIG. 3) is formed by folding and overlaying the second portion P2, so that the diffraction grating 12 will be placed on the first portion P1 despite the second portion P2 being folded over.

The second portion P2 is also provided with cutouts for forming the previously discussed clearance sections 34 (see FIG. 3, etc.). A portion serving as the previously discussed plastic deformation-preventing rib 37 is formed in the second portion P2 through mountain-folding (folding towards the distant side with respect to the plane of the drawing).

The third portion P3 (having a profile of substantially rectangular shape) continuing from the second portion P2 is mountain-folded (folded over towards the front side in the plane of the drawing with respect to the valley-folded second portion P2) to form the spring section 33. Predominantly, substantially all of the section constituting the third portion P3 is cut away except at the outer edge side, and the third portion P3 is folded over to obtain the previously discussed through-hole 36. As the size of the cut away portion is an element important not only in terms of ensuring a passage for light, but also of adjusting the spring force of the spring section 33, the size of the cut away portion will be determined in consideration of this point as well.

In more detail, the third portion P3 is slightly bent to adjust the elasticity at a location set apart from the folding location discussed previously. The portion serving as the previously discussed grip section 39 is formed in the third portion P3 by valley-folding (folding towards the front side in the plane of the drawing).

Figure 7:
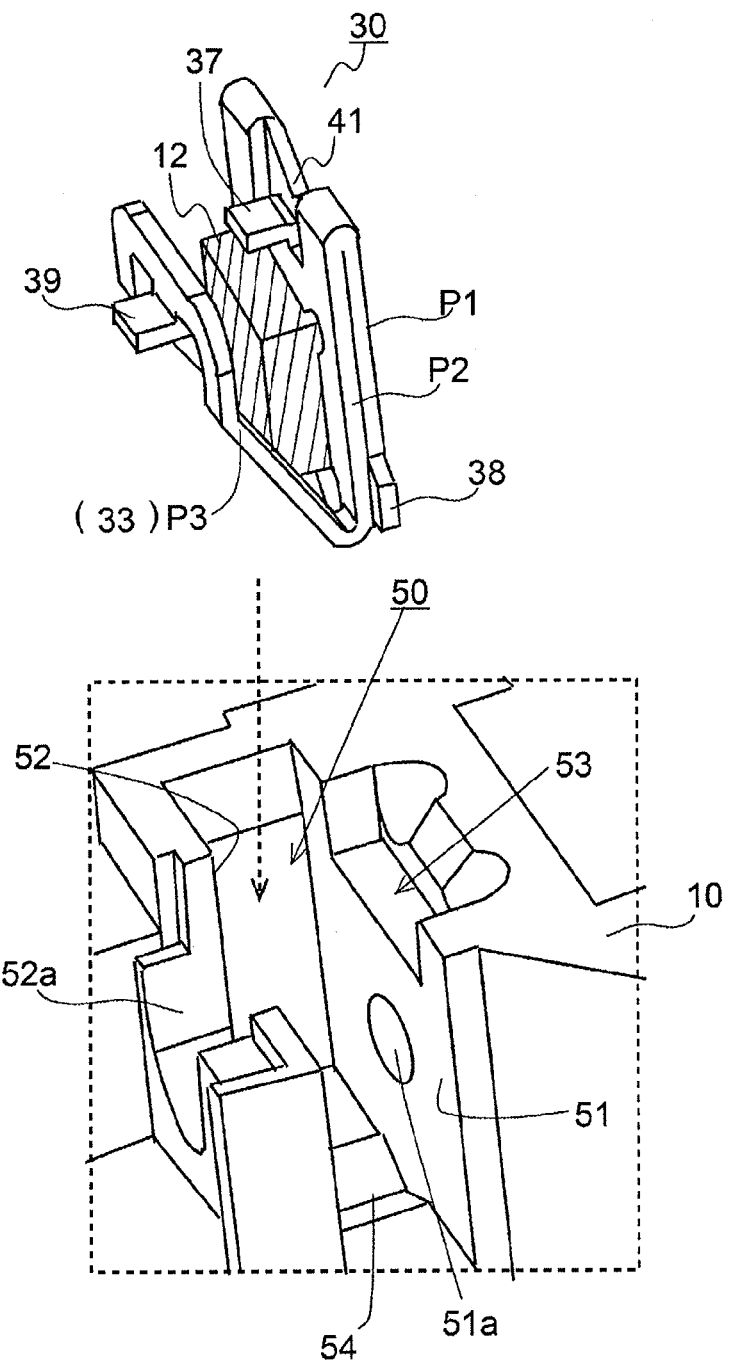
FIG. 7 is a schematic perspective view showing a configuration of an attachment section to which the diffraction grating holder is attached in the optical pickup of the present embodiment.
Figure 8:
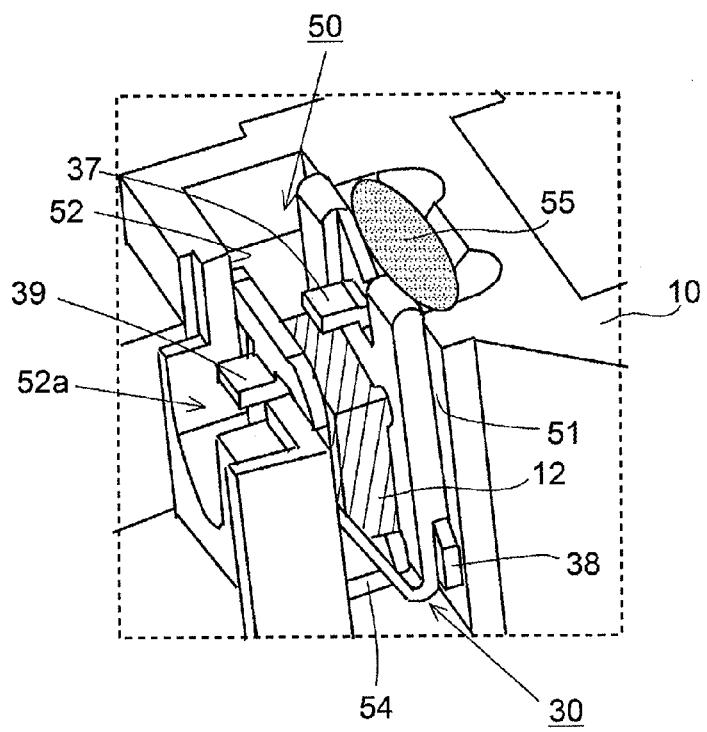
FIG. 8 is a schematic perspective view showing the diffraction grating holder housed in the attachment section shown in FIG. 7.

Next, the configuration of an attachment section 50 whereby the diffraction grating holder 30 is attached to the pickup base 10 will be described with reference to FIG. 7 and FIG. 8. FIG. 7 is a schematic perspective view showing a configuration of an attachment section in which the diffraction grating holder is attached in the optical pickup of the present embodiment. FIG. 7 also shows the diffraction grating holder 30 (which holds the diffraction grating 12) being housed in the direction of the broken line arrow. FIG. 8 is a schematic perspective view showing the diffraction grating holder housed in the attachment section shown in FIG. 7.

In the attachment section 50 are formed a first wall section 51 abutting the back face of the placement face 31 of the diffraction grating holder 30 (the back face of the face of the first portion P1 on which the diffraction grating 12 is placed), and a second wall section 52 abutting the spring section 33 (the third portion P3) of the diffraction grating holder 30. An optical path hole 51a is formed in the first wall section 51 to permit passage of light from the semiconductor laser 11 (not shown in FIGS. 7 and 8, see FIG. 2). A cutout 52a that is substantially U-shaped in plan view is formed in the second wall section 52, so that light exiting the diffraction grating reaches the polarizing beam splitter 13 (not shown in FIGS. 7 and 8, see FIG. 2).

An adhesive packing section 53 into which an adhesive is packed is provided to the upper section of the first wall section 51. A slotted section 54 substantially V-shaped in cross-sectional view and extending in a direction linking the first wall section 51 and the second wall section 52 is formed in the bottom face of the attachment section 50. The direction of extension of the slotted section 54 is a direction substantially parallel to the direction of propagation of light passing through the diffraction grating 12.

When the diffraction grating holder 30 is attached to the attachment section 50, the spring section 33 is elastically deformed, reducing the thickness of the diffraction grating holder 30. By virtue of the presence of the plastic deformation-preventing rib 37, the spring section 33 will not bend more than a predetermined amount in the direction in which the thickness is reduced; therefore, the diffraction grating holder 30 is not likely to plastically deform during attachment.

The reduced-thickness diffraction grating holder 30 is then lowered in the direction of the dashed arrow in FIG. 7 and housed inside the attachment section 50. At this time, the diffraction grating holder 30 is housed in the attachment section 50 in such a way that the distal end of the substantially V-shaped protruding section 40 of the diffraction grating holder 30 engages within the deepest section (the V-shaped distal end) of the slotted section 54. Once housed in the attachment section 50, the diffraction grating holder 30 is pressed against the first wall section 51 and the second wall section 52 by the elasticity of the spring section 33.

As discussed previously, the diffraction grating 12 must undergo rotational adjustment so that the positions of three spots of light formed on the information recording surface RS of the optical disk D assume the target locations. For this reason, the elasticity of the spring section 33 is adjusted so as to fulfill the condition that the diffraction grating holder 30 not readily dislodge from the attachment section 50, as well as the condition that rotational adjustment of the diffraction grating 12 can be performed through rotation of the diffraction grating holder 30.

This rotational adjustment is performed in the final stage of the optical pickup 1 assembly task. Specifically, the optical components 12 through 18, the semiconductor laser 11, and the photodetector 19 are attached to the pickup base 10; and after positional adjustment of the photodetector 19 is performed using the primary ray, the diffraction grating holder 30 is rotated to bring the auxiliary beams to the target locations, and rotational adjustment of the diffraction grating 12 is performed.

Once rotational adjustment of the diffraction grating 12 is completed, the diffraction grating holder 30 is anchored to the pickup base 10 so as to not move from the adjusted position. The grating holder 30 may be anchored to the pickup base 10, for example, by a method of introducing an ultraviolet-curing adhesive (UV adhesive) 55 (see FIG. 8) into the adhesive packing section 53 during the stage of rotational adjustment, and irradiating the adhesive with ultraviolet light in a stage where rotational adjustment has concluded.

Figure 9:
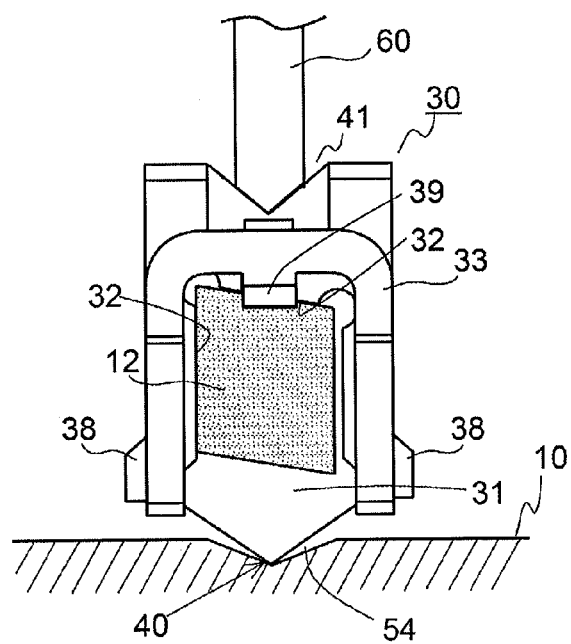
FIG. 9 is a schematic diagram showing the relationship of the diffraction grating holder and a slotted section of the attachment section in the optical pickup of the present embodiment.
Figure 10:
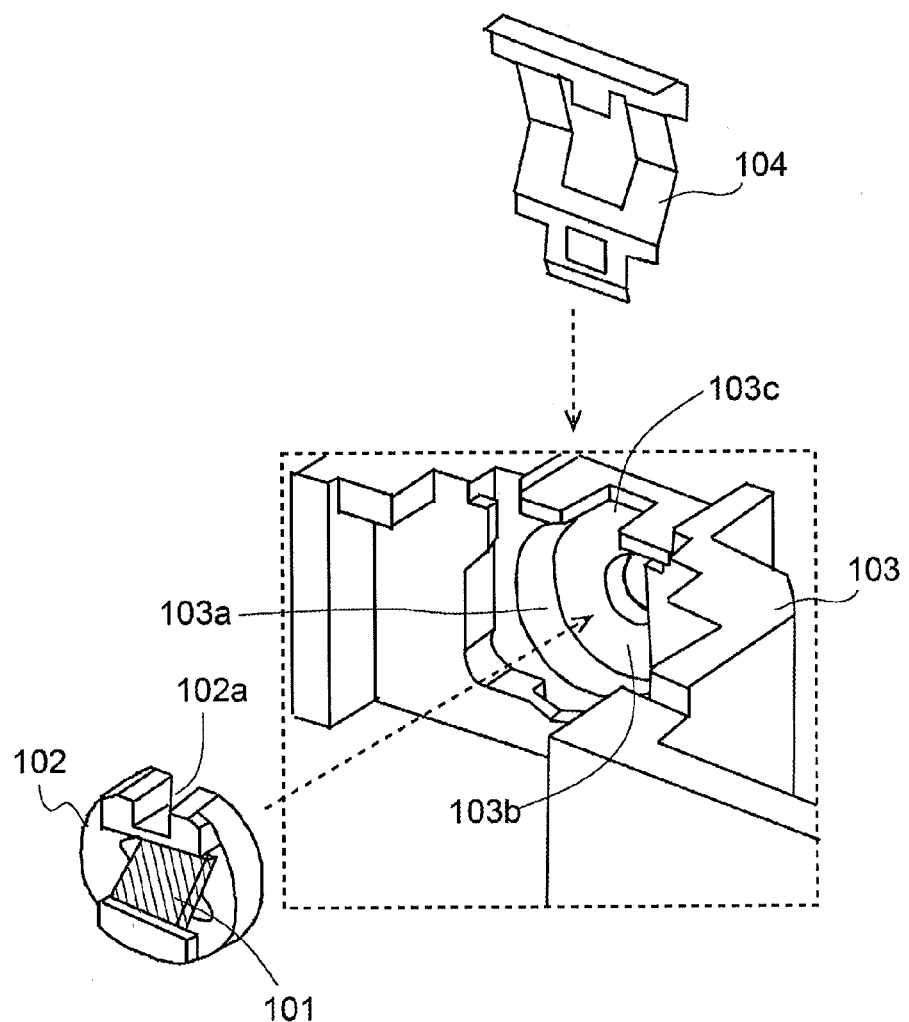
FIG. 10 is a schematic perspective view showing a diffraction grating prior to attachment to a base, in a conventional art optical pickup.
Figure 11:
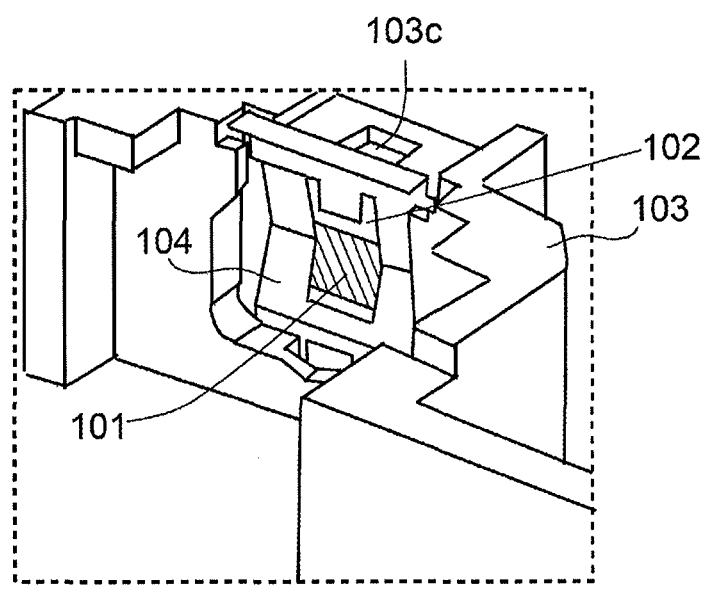
FIG. 11 is a schematic perspective view showing the diffraction grating attached to a base, in a conventional art optical pickup.

Rotational adjustment of the diffraction grating 12 is described here with reference to FIG. 9. FIG. 9 is a schematic diagram showing the relationship of the diffraction grating holder and the slotted section of the attachment section in the optical pickup of the present embodiment. As shown in FIG. 9, when performing rotational adjustment of the diffraction grating 12, an adjustment jig (adjustment pin) 60 engages the jig-engaging portion 41 of the diffraction grating holder 30. The diffraction grating holder 30 is then caused to rotate by the adjustment jig 60 about the distal end of the V-shaped protruding section 40 as the rotation center (the adjustment pin 60 is moved in the left-right direction in FIG. 9), to bring the positions of the light spots to the predetermined positions.

The V shape of the slotted section 54 of the attachment section 50 is gentler than the slope of the protruding section 40 of the diffraction grating holder 30, so that the diffraction grating holder 30 can rotate centered on the distal end of the V-shaped protruding section 40. Also, due to the presence of the stopper section 38 provided to the side face section of the diffraction grating holder 30, the diffraction grating holder 30 does not rotate more than necessary.

With the diffraction grating holder 30 housed in the attachment section 50, the grip section 39 provided to the diffraction grating holder 30 projects into the cutout 52a, which is substantially U-shaped as seen in plan view, and which is formed in the second wall section 52 (see FIG. 8). Accordingly, the grip section 39 can also function as a stopper for restricting the amount of rotation of the diffraction grating holder 30. Specifically, in some instances, the grip section 39 may serve as a stopper section in place of the stopper section 38.

In the present embodiment described above, the diffraction grating holder 30 is configured using sheet metal. There is accordingly no need to provide a separate spring, as in cases where the diffraction grating holder is formed of resin, more readily allowing costs to be reduced. In the diffraction grating holder 30 there is adopted a configuration in which a step equivalent in thickness to the sheet metal produced by folding is utilized as the positioning wall 32. Therefore, the task for placement of the diffraction grating 12 in the diffraction grating holder 30 is more readily accomplished. Also, the diffraction grating holder 30 of the present embodiment is readily obtained by working of sheet metal, and the attachment section 50 in which the diffraction grating holder 30 is attached can be simplified.

The embodiment shown herein is but one example of the present invention, and the optical element holder and optical pickup of the invention are not limited to the configurations shown herein.

For example, in the embodiment shown herein, the diffraction grating holder 30 is configured to have the plastic deformation-preventing rib 37, the stopper section 38, and the grip section 39. However, configurations in which at least one of these is absent are included in the invention as well.

The configuration in the embodiment shown herein is one in which the optical element holder of the present invention is a diffraction grating holder. However, the optical element holder of the present invention has wide potential application in optical elements requiring rotational adjustment, not just diffraction gratings. The optical element holder of the invention is not limited to application in an optical pickup; it may be used in other optical devices as well, as shall be apparent. Further, the optical pickup in which the diffraction grating holder of the invention is applied may differ from the configuration of the present embodiment, for compatibility with multiple types of optical disk.

The optical element holder of the present invention is suited to optical elements that require rotational adjustment; e.g., it is suitable as a diffraction grating holder for holding a diffraction grating provided to an optical pickup.

What is claimed is:

1. An optical element holder formed out of a sheet of metal comprising:
   a placement section on which an optical element is placed and in which a through-hole is formed to permit light to impinge on the optical element;
   an elastic section in which an opening opposing the through-hole is formed and which has elasticity in an opposing direction in which the through-hole and the opening oppose each other; and
   a protruding section which is provided in one end section of the placement section and which protrudes in a direction substantially perpendicular to the opposing direction, the protruding section being substantially V-shaped along a center line of the placement section,
   wherein the elastic section is fixed to the placement section,
   the optical element is arranged between the placement section and the elastic section, and
   the optical element holder is capable of being rotated about a tip end of the substantially V-shaped protruding section.

2. The optical element holder of claim 1, wherein in the placement section, a first recessed section is provided at a position opposing the protruding section.

3. The optical element holder of claim 2, wherein the through-hole is provided on a line connecting between the protruding section and the first recessed section.

4. The optical element holder of claim 2, wherein
the first recessed section is provided in an end section of the placement section opposite from the one end section thereof in which the protruding section is provided.

5. The optical element holder of claim 2, wherein
the first recessed section is an engaging portion for engaging with an adjustment jig used when the optical element is subjected to the rotational adjustment.

6. The optical element holder of claim 1,
further comprising a stopper section provided in the placement section so as to project therefrom, the stopper section being provided to hold the protruding section from opposite sides.

7. An optical pickup comprising the optical element holder of claim 1, further comprising:
a base having a light source and a plurality of optical elements including the optical element, wherein
an attachment section to which the optical element holder is attached is provided on the base.

8. The optical pickup of claim 7, wherein the protruding section of the optical element holder is substantially V-shaped; and
a substantially V-shaped slotted section for engaging with the protruding section is formed on the attachment section.

9. The optical pickup of claim 8, wherein
the slotted section has a V-shape with a gentler inclination than a V-shape of the protruding section.

10. The optical pickup of claim 7, wherein the particular optical element is a diffraction grating.

11. The optical pickup of claim 7, wherein
the tip end of the protruding section serves as a rotation center about which the optical element holder is rotated relative to the base.

12. The optical pickup of claim 7, wherein
the attachment section includes a pair of wall sections arranged on opposite sides of the optical element holder, with the placement section making contact with one of the wall sections and the elastic section making contact with the other of the wall sections.

13. The optical element holder of claim 1, wherein on a face of the placement section on which the optical element is placed, a positioning wall is provided for positioning the optical element by forming a step in the opposing direction.

14. The optical element holder of claim 13, wherein a second recessed section for protecting a corner of the optical element placed on the placement section is formed in the positioning wall.

15. The optical element holder of claim 14, wherein the second recessed section is semicircular as seen in a plan view.

16. The optical element holder of claim 1, wherein the elastic section has a face substantially parallel to a face of the placement section on which the optical element is placed.

17. The optical element holder of claim 1, wherein
the elastic section makes contact with and is pressed against a wall included in an attachment section to which the holder is attached.

18. An optical element holder formed out of a sheet of metal comprising:
a placement section on which an optical element is placed and in which a through-hole is formed to permit light to impinge on the optical element;
an elastic section in which an opening opposing the through-hole is formed and which has elasticity in an opposing direction in which the through-hole and the opening oppose each other;
a protruding section which is provided in one end section of the placement section and which protrudes in a direction substantially perpendicular to the opposing direction, and
a positioning wall, which is provide on the placement section, for positioning the optical element by forming a step in the opposing direction,
wherein the elastic section is fixed to the placement section,
the optical element is arranged between the placement section and the elastic section, and
a recessed section for protecting a corner of the optical element placed on the placement section is formed in the positioning wall.

19. The optical element holder of claim 18, wherein
the recessed section is semicircular as seen in a plan view.

* * * * *